United States Patent [19]

Shade, Jr. et al.

[11] 4,220,194
[45] Sep. 2, 1980

[54] SCAVENGING OF THROTTLED MSR TUBE BUNDLES

[75] Inventors: Russell L. Shade, Jr., Cape Elizabeth; William G. Reed, Portland; Jack S. Mazer, South Portland, all of Me.

[73] Assignee: General Electric Company, Schenectady, N.Y.

[21] Appl. No.: 927,028

[22] Filed: Jul. 24, 1978

Related U.S. Application Data

[63] Continuation-in-part of Ser. No. 890,674, Mar. 27, 1978.

[51] Int. Cl.² .............................................. F28B 9/02
[52] U.S. Cl. ........................................ 165/1; 122/32; 122/483; 165/108; 165/113; 165/114; 165/174
[58] Field of Search .................. 122/32, 483; 165/108, 165/111, 113, 114, 174, 1

[56] References Cited

U.S. PATENT DOCUMENTS

| | | | |
|---|---|---|---|
| 1,798,795 | 3/1931 | Hilger | 165/108 |
| 2,217,410 | 10/1940 | Howard | 165/108 |
| 3,073,575 | 1/1963 | Schulenberg | 165/174 |
| 3,203,475 | 8/1965 | Crews et al. | 165/108 |
| 3,593,500 | 7/1971 | Ritland et al. | 122/483 |
| 3,712,272 | 1/1973 | Carnavos et al. | 122/483 |
| 3,713,278 | 1/1973 | Miller et al. | 122/483 |
| 3,724,212 | 4/1973 | Bell | 60/644 |
| 3,830,293 | 8/1974 | Bell | 165/113 |

OTHER PUBLICATIONS

Jet Compressors, Amtek-Schutte & Koerting Division, Bulletin 4F, Cornwells Heights, Pa., 1976.

Primary Examiner—Sheldon Richter
Attorney, Agent, or Firm—John F. Ahern

[57] ABSTRACT

Improved means for substantially eliminating condensate subcooling in single-stage moisture separator reheaters is provided by recirculating large quantities of scavenging steam through the reheater tube bundle. Heating steam for the tubeside (within the tubes of the tube bundle) of the reheater is extracted from the main steam supply upstream of the high-pressure turbine. This main steam is throttled before entering the tube bundle at part load conditions to reduce the temperature differential with respect to the high-pressure turbine exhaust steam which is to be reheated on the shell-side. The tubes of the tube bundle are differentially orificed at their inlet to provide sufficient steam to each tube based on complete condensation at tube exit. At throttled, part load conditions, considerable excess scavenging steam is required to correct for the inefficiencies of the fixed orifices at these off-design conditions. Substantial amounts of scavenging steam are recirculated through the tube bundle with the use of a high differential pressure thermocompressor. Unthrottled, high-pressure main steam is isentropically expanded in the thermocompressor, drawing a substantially higher amount of throttled, lower pressure steam from the outlet header of the tube bundle. The combined discharge steam from the thermocompressor is fed to the inlet of the tube bundle, resulting in a recirculation of large quantities of scavenging steam. Minimal thermodynamic loss is achieved since the tube bundle scavenging steam is reused to continually scavenge the tube bundle.

11 Claims, 4 Drawing Figures

SCAVENGING OF THROTTLED MSR TUBE BUNDLES

This application is a continuation-in-part of our copending application Ser. No. 890,674, filed Mar. 27, 1978, and assigned to the same assignee as this application.

BACKGROUND OF THE INVENTION

1. Field of the Invention

This invention relates to moisture separator reheaters and more particularly to improved single-stage reheaters for moisture separator reheaters used in nuclear steam turbine power plants.

2. Description of the Prior Art

Steam derived from a fossil-fueled boiler is generally hot and dry and contains sufficient energy to operate the high-pressure turbine. Thereafter, it is generally reheated in the boiler so that sufficient useful work may be performed thereby, first in intermediate and then in low-pressure stages. Steam from a nuclear steam generator or reactor, on the other hand, is generally of relatively low temperature and is saturated. After passing through a high-pressure turbine stage the nuclear steam contains sufficient entrained moisture that it must be demoisturized, and preferably reheated, thereby increasing its enthalpy in order that it reliably perform further useful work.

Moisture separator reheaters of various types are well known in the art. One example of such moisture separator reheaters is disclosed in U.S. Pat. No. 3,712,272, Carnavos et al. The moisture separator reheater disclosed in the Carnavos et al patent employs two reheater sections each of which comprises a bank or bundle of U-shaped tubes extending longitudinally within a pressure-tight shell and including a header for introducing a heating fluid (steam) to the tubes and withdrawing the fluid (condensate) from the tubes. The Carnavos header is provided with a vertical baffle disposed substantially at the middle thereof dividing the header into inlet and outlet sections. Each tube has one end communicating with the inlet section and another end communicating with the outlet section. In operation, saturated heating steam is fed to the U-shaped tubes through the inlet section of the header, traverses the tubes, and exits the tubes through the outlet section of the header, any condensate formed in the reheater tubes being drained through a single drain provided in the outlet section.

Another example of a moisture separator reheater employing two reheat tube bundles is described in U.S. Pat. No. 3,713,278—Miller et al. In this design, the header is provided with a substantially horizontal baffle disposed substantially at the middle thereof, dividing the header into an upper inlet section and a lower outlet section. The U-bends of the tubes are thus disposed in the vertical direction. A further moisture separator reheater design employing a single reheat bundle is disclosed in U.S. Pat. No. 3,593,500, Ritland et al.

Under certain operating conditions, substantial quantities of the reheating steam may condense within the most highly loaded tubes of all these moisture separator reheater designs. If all of the incoming steam to these tubes is completely condensed before the tube end, a buildup of subcooled condensate can result. Problems associated with condensate subcooling and related instabilities, well known to the reheater arts, are described in our aforementioned copending application. Also described therein are the beneficial effects of tube orificing and tube bundle scavenging flow in alleviating these problems. Tube orificing is disclosed in U.S. Pat. No. 3,073,575, Schulenberg. Tube bundle scavenging flow, well known in the art, is typically "dumped" to a lower point in the system, as described in U.S. Pat. No. 3,724,212, Bell. A substantial thermodynamic loss results from the dumping of scavenging steam to lower points in the system.

One prior art solution to the thermodynamic loss associated with dumping of scavenging steam to a lower point in the system is disclosed in our aforementioned copending application Ser. No. 890,674 assigned to the assignee of the present invention and incorporated herein by reference thereto. In the preferred embodiment of the claimed invention thereof a high differential pressure thermocompressor is utilized to recirculate substantial quantities of scavenging steam in the lower pressure first-stage tube bundle of two-stage moisture separator reheaters. Relatively small quantities of high-pressure scavenging steam from the higher pressure second-stage tube bundle are used to drive the thermocompressor. In the operation of this claimed preferred embodiment the solution normally requires at least two tube bundles operating at substantially different pressures.

In U.S. Pat. No. 3,830,293, Bell discloses a technique for recirculation of scavenging steam in tube and shell heat exchangers employing one tube bundle. A low differential pressure (approximately 10-20 psid) thermocompressor is utilized in the tube bundle steam supply line to cause a recirculation of scavenging steam within the tube bundle. However, the amount of scavenging steam which can be recirculated by this technique is not sufficient to eliminate condensate subcooling since the low differential pressure across the thermocompressor makes it very inefficient, and an alternate source of higher pressure steam is not taught to be desirable or necessary.

The improved means for substantially eliminating condensate subcooling in throttled single-stage reheaters by the present invention takes advantage of the throttling of the heating steam in utilizing a high differential pressure thermocompressor to recirculate substantially higher quantities of scavenging steam within the tube bundle, with minimal thermodynamic loss, than has been previously available.

Accordingly, it is an objective of the present invention to provide improved means for substantially eliminating condensate subcooling in throttled, single-stage reheater tube bundles, with minimal thermodynamic loss, by utilizing high-pressure steam taken from upstream of the tube bundle supply line throttling valve or valves to drive a much more efficient high differential pressure thermocompressor.

BRIEF DESCRIPTION OF THE INVENTION

In accord with a preferred embodiment of our invention, the foregoing objects are attained by providing in a single-stage moisture separator reheater tube bundle pumping means for recirculating large quantities of scavenging steam within the tubes of the bundle. The inlet ends of vertically disposed U-tubes may be differentially orificed to better provide sufficient steam to each tube to avoid condensate subcooling. Main steam extracted from upstream of the high-pressure turbine is used as the heating fluid (steam) for the tube bundle. Due to the nature of the nuclear reactor or steam generator, variations in main steam pressure across the turbine load range are minimal. A path is provided to supply a high differential pressure thermocompressor with main steam taken from upstream of tube bundle supply line throttling valve or valves. Piping means are made available from the outlet header section of the tube bundle to the low-pressure suction portion of the thermocompressor. By this technique, the pressure of the motive steam for the thermocompressor is at least 1.5 times (and as high as 10 times) that of the throttled suction steam. With this pressure ratio of at least 1.5, the thermocompressor (hereinafter referred to as a high differential pressure (high $\Delta$ P) thermocompressor) serves to draw substantially more suction steam than motive steam which is provided. Piping means are provided for the combined discharge steam from the thermocompressor, at an intermediate pressure, to be fed into the inlet chamber of the tube bundle header (inlet header).

By this technique, scavenging flow rates in the order of 50% to 100% of the bundle flow rate, defined by the heat transfer duty, are readily achievable at the partial load conditions where the inlet flow is throttled and high scanvenging rates are required. The well known problems of condensate subcooling and related instabilities are thus substantially eliminated. Furthermore, since the scavenging steam is continually recirculated through the tube bundle, the substantial elimination of condensate subcooling is accomplished with minimal thermodynamic loss. A small purge is provided from the system for removal of any non-condensable gases which will tend to build up. Also, at high power levels where the heating steam to the tube bundle is no longer throttled, the heat transfer duty on the numerous U-tubes in the bundle may easily be accommodated by differential tube orificing in conjunction with a relatively low rate of scavenging steam being dumped to a lower point in the system. Under these conditions the thermocompressor, although less efficient, may continue to operate, thus avoiding its restarting upon subsequent load changes.

DESCRIPTION OF A PREFERRED EMBODIMENT

Figure 1:
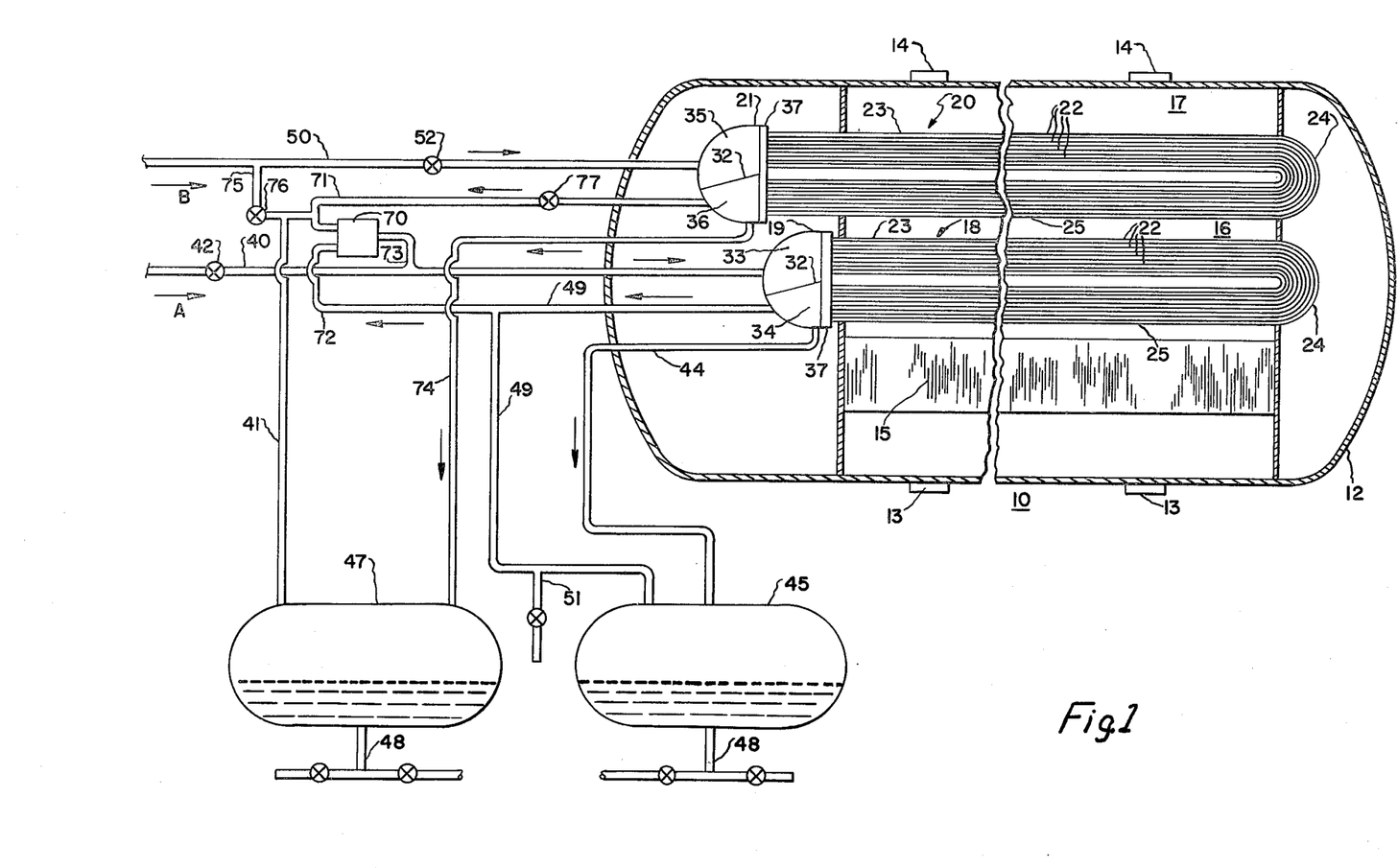
FIG. 1 is a partially schematic vertical cross-sectional view of a two-stage moisture separator reheater and associated accessories embodying the present invention.

In FIG. 1 a moisture separator reheater, represented generally at 10, includes a pressure vessel 12 typically containing a plurality of steam inlets 13 and a plurality of steam outlets 14 to facilitate the passage of steam therethrough in order that it be dried and reheated. This is the same configuration of a two-stage moisture separator reheater described in our copending application Ser. No. 890,674 and illustrated as FIG. 1 thereof.

Moisture separator panels 15, which are well known to the art, function to remove substantially all entrained moisture from the incident steam. The moisture separator panels have a very large surface area with so-called "wiggle plates" and have a drain system therefor (not shown) which collects the moisture drained from the panels and provides a path for removal of the moisture from shell 12.

A plurality of reheaters 16 and 17 are located immediately above moisture separator panels 15 and are within the path traversed by steam as it passes from inlets 13 to outlets 14.

First stage reheater 16 includes tube bundle 18 and header 19. Second stage reheater 17 includes tube bundle 20 and header 21. During such traversal the shellside steam passes in heat-transfer relationship across a plurality of U-tubes 22, each of which carries within it high-pressure, saturated steam, the sources of which will be described hereinafter. Each U-tube 22 comprising the respective tube bundles 18 and 20 includes a nearly horizontal section 23, a rounded vertically oriented U-bend section 24, and a nearly horizontal outlet section 25. Each of headers 19 and 21 contains a pass-partition plate 32 which separates the respective headers and into upper inlet chambers 33 and 35 and lower exhaust chambers 34 and 36. Each tube of tube bundles 18 and 20 has an inlet end in communication with the upper inlet chamber of its associated header, and the other end thereof is in communication with the lower, outlet, chamber of the same header.

First stage reheater inlet header 33 receives saturated steam, at a pressure substantially above that of shellside steam, through pipe 40, including source valve 42, and has its origin at an extraction port of the high-pressure turbine. It passes through tubes 22 of reheater 16 passing heat to shellside steam by in-tube condensation and exits into outlet header as condensate which is removed by drain line 44 and residual steam which exits to the suction side of thermocompressor 70 and purge line 51 via pipe 49.

Second stage reheater inlet header 35 receives saturated steam taken from upstream of the high-pressure turbine through line 50, throttled at partial loading conditions at valve 52, and at a pressure which is substantially in excess of the pressure of saturated steam input to inlet header 33 of reheater 16. This steam is passed through tubes 22 of reheater 17 passing heat to shellside steam by in-tube condensation and exits to outlet header 36 as condensate, which is passed to drain tank 47 by pipe 74, and as excess steam, which becomes motive steam for thermocompressor 70 and is passed to the same through pipe 71.

Thermocompressor 70, operated by motive steam for pipe 71, entrains a larger mass flow of exhausted steam from pipe 72 and provides a large mass flow of scavenging steam via pipe 73 to inlet header 33 to reheater header 19. This flow of steam is sufficient to scavenge reheater tube bundle 18 and substantially eliminate condensate subcooling and related instabilities.

In our copending application Ser. No. 890,674, we recognized that the advantages of such scavenging of the first reheater tube bundle could be maintained if the second stage reheater were shut down and the MSR were in effect operated as a single-stage MSR. To this extent we provided means including pipe 75 and valve 76 which make it possible to operate thermocompressor 70 with a portion of the high-pressure steam available from the main source. Thus to achieve this valve 52 is closed, as is valve 77, isolating second stage reheater 17 from the steam flow. Valve 76 is opened to provide unthrottled steam at a pressure significantly higher than that available in line 40, to drive thermocompressor 70 to provide the desired scavenging steam for reheater 16.

As described above, a two-stage reheater has the high-pressure stage removed from service, leaving the apparatus to function as a single-stage reheater with the exhausted steam recirculated by a high $\Delta P$ thermocompressor within the operating tube bundle for scavenging purposes. A single-stage reheater, designed to operate as such will naturally have a different configuration. An optimized arrangement for such reheater operation is illustrated in FIG. 2.

Figure 2:
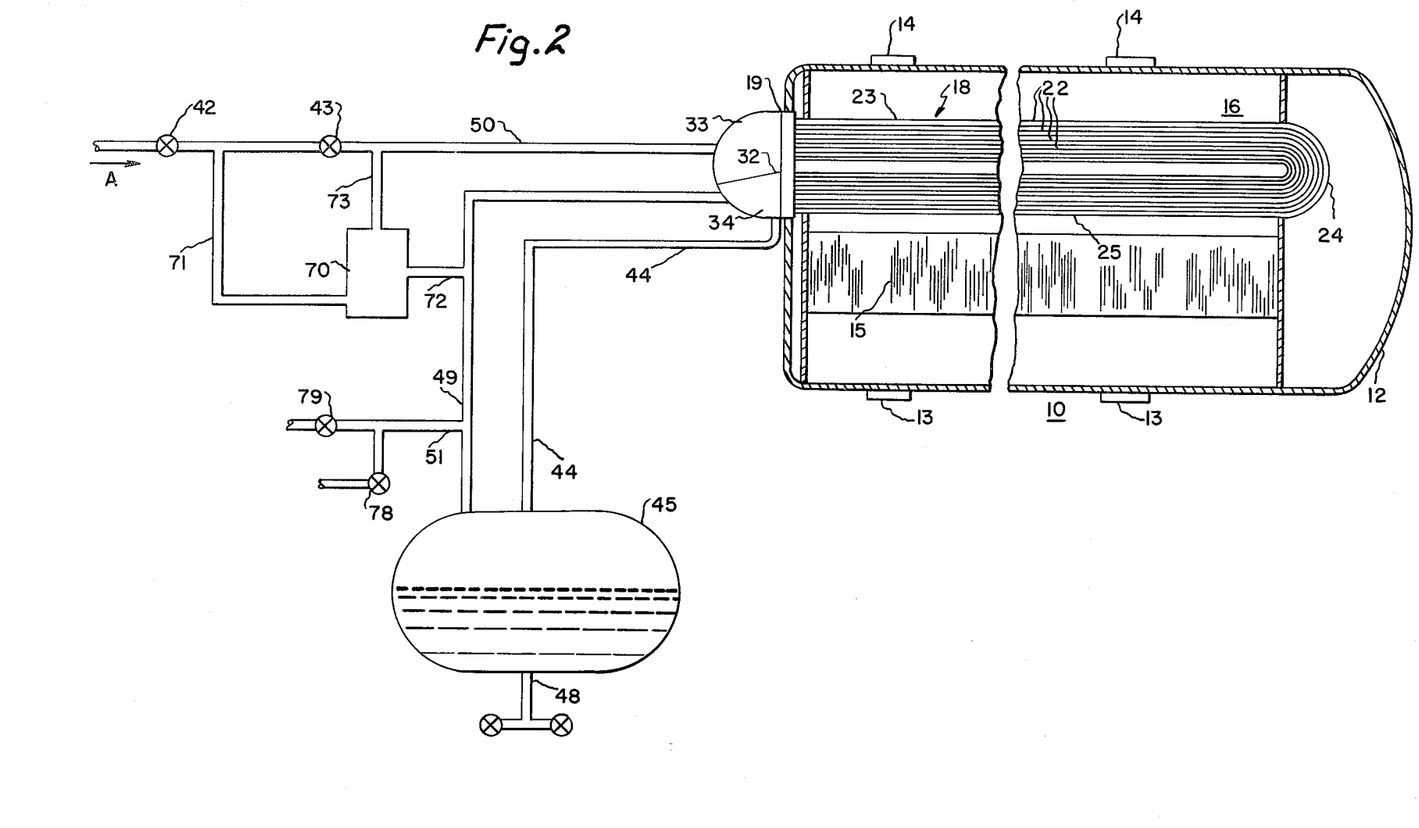
FIG. 2 is a partially schematic vertical cross-sectional view of a single-stage moisture separator reheater and associated accessories constructed in accord with a preferred embodiment of the present invention.

In FIG. 2 in which like numbers refer to like parts of the apparatus illustrated in FIG. 1, a moisture separator reheater, represented generally at 10, includes a pressure vessel 12 typically containing a plurality of steam inlets 13 and a plurality of steam outlets 14 to facilitate the passage of steam therethrough in order that it be dried and reheated. Moisture separator panels 15 which are well known to the art are disposed over inlets 13 and inlet plenums (not shown) and function to remove substantially all entrained moisture from the incident steam.

The reheater 16 includes tube bundle 18 and header 19. During such traversal the shellside steam passes in heat-transfer relationship across a plurality of U-tubes 22, each of which carries within it high-pressure, saturated steam, the source of which will be described hereinafter. Each U-tube comprising tube bundle 18 includes a nearly horizontal inlet section 23, a rounded vertically oriented U-bend section 24, and a nearly horizontal outlet section 25. Header 19 contains a pass-partition plate 32 which separates the header and into an upper limit chamber 33 and a lower exhaust chamber 34. Each tube of tube bundle 18 has an inlet end in communication with the upper inlet chamber of the header, and the other end thereof is in communication with the lower, outlet chamber of the same header.

Due to the parallel paths of all of the U-tubes in a given tube bundle array all of such tubes are constrained to the same pressure difference (driving force) from inlet to outlet header section.

Operationally, main steam taken from upstream of the high-pressure turbine is made available to reheater 16 through pipe 50, including source valve 42 and throttling valve(s) represented by 43, and enters into inlet chamber 33 of header 19. This steam passes through U-tubes 22, thus undergoing two longitudinal passes along the length of and parallel to the longitudinal axis of shell 12 and exercises of curved downward excursion as it reaches the end of the first horizontal excursion and returns to exhaust chamber 34 of header 19. During passage through U-tubes 22 a certain proportion of the steam contained therein becomes condensed as it passes with the uncondensed steam to the outlet header section where it is discharged through drain pipe 44 to drain tank 45 exterior of shell 12. The liquid phase in tank 45 is generally drained to a feedwater heater or to the main condenser through line 48. A drain vent line 49 is provided to equalize pressure in the outlet header section and drain tank 45. From drain vent line 49 a pipe 72 is provided for passage of the exhausted tube handle scavenging steam to the thermocompressor 70. A pipe 51 is also provided from drain vent 49 for continuous purging of non-condensable gases through valve 78, and scavenging steam through valve 79 to lower pressure points in the system.

The main steam indicated by arrow A, which enters through heating steam inlet pipe 50 including a source of saturated steam, an inlet source valve 42, and throttling valve(s) represented by 43, is generally taken from upstream of the high-pressure steam turbine.

The pressure of this main steam is relatively high and approximately constant across the load range. In pressurized water reactor applications, the main steam pressure will actually reduce slightly as load is increased. The shellside steam, on the other hand, is from the high-pressure turbine exhaust, and ramps linearly upward with turbine load to a value of roughly 1/6 the main steam pressure at full power. If main steam were allowed to enter tube bundle 18 through inlet pipe 50 across the load range, the differential in temperature between this main steam (typically at a pressure in the order of 1000 psia) and the incoming shellside steam would be excessive at partial loading conditions, well in excess of 200° F. This severe part load temperature differential would aggravate tube bundle distortion problems resulting from the substantial differential thermal expansion, and would also result in a potentially severe degree of condensate subcooling which could be experienced in the tubes. In order to alleviate these problems, the main steam in inlet pipe 50 is typically throttled via valve 43 at part loading conditions.

Although a plurality of valves 43 may be used, one is shown for clarity. Numerous techniques are available for throttling this main stream; however, a typical mode would be to control the throttling valve or valves 43 from high-pressure turbine exhaust steam pressure such that the steam pressure to tube bundle 18 is ramped linearly from a low load condition upward to main steam pressure in the range of 50% to 80% turbine load. As used herein and in the appended claims, the phase "throttled steam" is meant to connote steam which is reduced in pressure at part loading conditions of the associated turbine.

As the shellside steam entering shell 12 passes from inlets 13 across the tubes 22 of the tube bundle 18, and becomes progressively reheated, the temperature differential between the tubeside steam and the shellside steam continually decreases. One significant problem to which this invention is most specifically directed results from the changing temperature differential between the shellside steam and the tubeside steam as the shellside steam is reheated. The shellside steam may also contain some residual moisture carried through from moisture separator panels 15 which must be evaporated by heat transfer from the lower rows of tubes of tube bundle 18, before reheating of the steam may begin. Obviously with the greatest temperature differential between tubeside and shellside steam and the added evaporative duty the tendency is for the greatest heat transfer rate to occur in lower tubes of tube bundle 18 which in turn require that a greater quantity of tubeside steam be provided to the outer U-tubes in vertically oriented reheater tube bundles.

With the inlet ends of all U-tubes in communication with the inlet section 33 of the header and the outlet ends of all U-tubes in communication with the outlet section 34 of the header 19, all U-tubes are constrained to the same pressure difference. As a result, the other (vertical) U-tubes are not supplied with sufficient steam to satisfy the heat transfer demand. The steam in these U-tubes is thus completely condensed before tube end, and condensate subcooling results downstream of the point of complete condensation is satisfying the heat transfer demand. On the other hand, the inner (vertical) U-tubes which pass more steam than is theoretically required, discharge a two-phase saturated mixture into outlet section 34 of header 19.

It is well known in the reheater arts, as described in our aforementioned copending application Ser. No. 890,674, that numerous problems can result from the occurrence of subcooled liquid. Two problems in particular relate to the tube-to-tubesheet weld cracking and overall system instability.

It is further well known that selective restriction of certain of the tubes to match tubeside flow rate with actual heat transfer duty can reduce subcooling. Such a solution for the reduction of subcooling and related instabilities in steam heat exchangers is shown by U.S. Pat. No. 3,073,575, Schulenberg. Thus, one may counteract much of the problem by a technique known as "orificing".

While orificing is one technique for overcoming the problem of differential condensation in U-tubes of a reheater tube bundle and thereby substantially eliminating condensate subcooling, perhaps the simplest way, conceptually, to avoid this problem is to pass through the tube bundle a sufficient quantity of saturated steam in excess of that which is required theoretically to cause reheating and thereby scavenge all U-tubes. This expedient is, however, normally not practicable from an efficiency point of view since it represents an unjustifiable waste of energy. More practical schemes inside the use of additional header partitioning as is shown in U.S. Pat. No. 3,996,897, Herzog. According to the invention disclosed and claimed therein, inlet steam enters a partitioned inlet section of the header of a horizontally oriented tube bundle and passes through the lower half of the U-tubes to a return section of the header where condensate formed in the initial two longitudinal passes through the U-tubes is drained off. The saturated steam then re-enters the tubes of the tube bundle, entering the upper half of the tube bundle and returning to the opposite section of the header from which accumulated condensate is again drained. This arrangement comprises a "four-pass" arrangement and decreases the tendency toward condensate flooding and resultant thermal cycling.

In yet another "four-pass" arrangement disclosed in U.S. Pat. No. 3,759,319, Ritland, a separate manifold is contained within the reheater to recirculate once circulated saturated steam through certain U-tubes of a reheater tube bundle.

Unfortunately, orificing and alternative measures as discussed above are not normally a complete answer for the problems of condensate subcooling and related instabilities in moisture separator reheaters. One reason for orificing not being a complete solution is that any given orificing arrangement, although calculated and implemented to distribute the steam flow in the respective tubes so as to satisfy the theoretical heat transfer demand for one given operating condition, is not ideal for all operating conditions. Orificing which is ideal for one set of conditions may not be suitable for a different set of conditions, e.g., as turbine loading is changed from one power level to another, or as in the case of single-stage reheaters, when the heating steam is throttled at partial load conditions.

Figure 4:
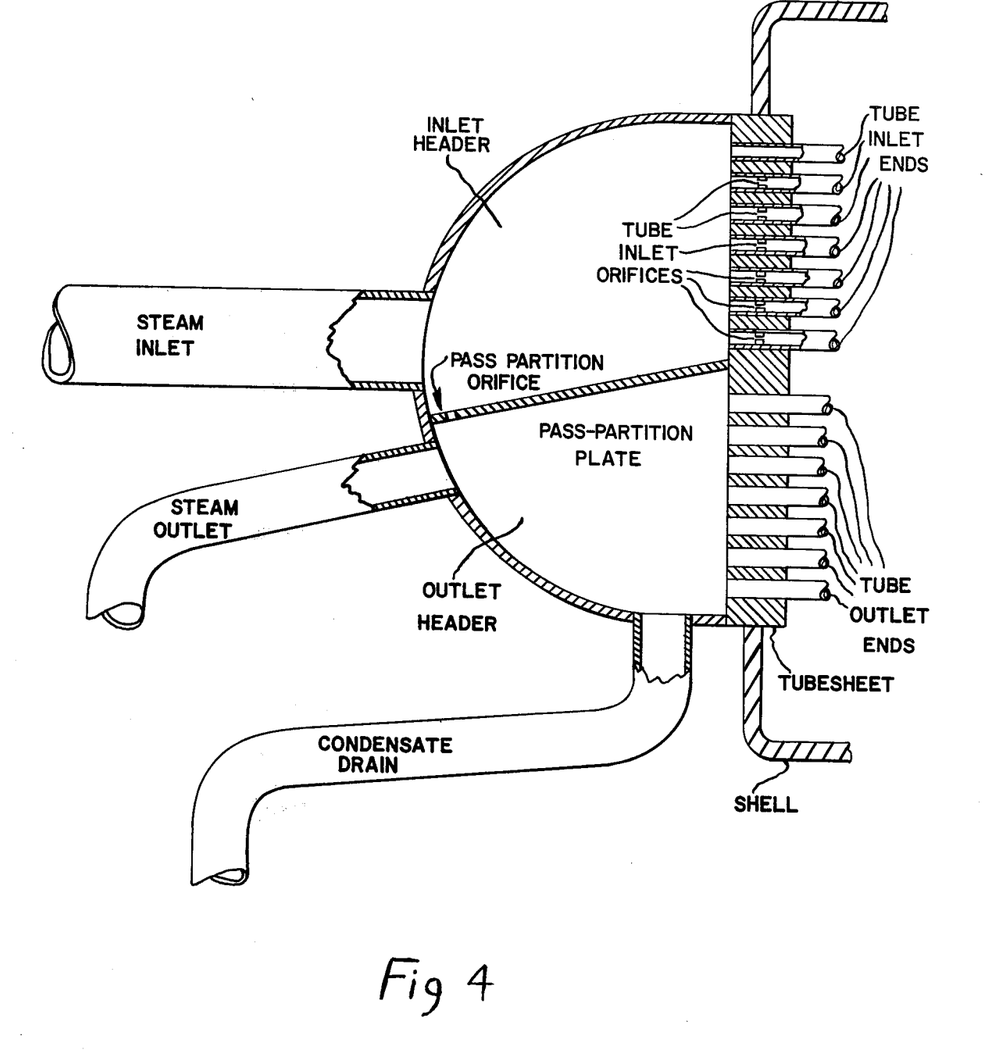
FIG. 4 is a schematic partial vertical cross-sectional view of the header portion of the reheater of FIG. 2 illustrating the same in greater detail.

The invention described herein may be used together with orificing as is shown in FIG. 4 (which is a portion of FIG. 2 of our aforementioned application Ser. No. 890,674), (or other equivalent techniques) or independently thereof, to improve the operation of reheaters in moisture separator reheaters utilized with steam turbine generator apparatus to substantially eliminate condensate subcooling and related instabilities.

It is well known that steam lines may be purged to remove water impurities and the like therefrom by the passage of high-pressure gas or steam therethrough. Thus, it would be feasible to prevent subcooling of condensate within reheater tube bundles by increasing the flow of saturated steam to the tube bundle from its source of input steam by a predetermined amount in excess of that which is theoretically required for a given load to reheat shellside steam. If enough excess saturated steam were taken from the tube bundle source, even if orificing were not utilized, the subcooling of condensate could be substantially eliminated. On the other hand, it is essential that steam generated for use with a steam turbine must be carefully utilized and the maximum work extracted therefrom in the necessary functions of the steam turbine, as for example, reheating of steam in a moisture separator reheater, heating of feedwater prior to its entry to the steam generator or reactor, and the use of the final product of a condenser as feedwater for the system. The indiscriminate use of high-pressure steam at an elevated temperature and pressure which could otherwise be utilized in a more productive and efficient use of the heat imparted thereto for such scavenging can significantly detract from the efficiency of the entire system. Since steam turbines are normally used for periods in an excess of 30 and as often as high as 40 years, the wasting of a significant percentage of steam to accomplish an objective such as substantially eliminating subcooling of condensate in reheater tube bundles can prove exceptionally costly in the amount of unnecessary fuel required to be used in order to achieve such an objective over an extended period of years.

In accordance with the present invention we use, as scavenging steam to substantially eliminate condensate subcooling in the reheater tube bundle, steam which is recirculated to the tube bundle inlet. Motive power is provided by the main steam taken from upstream of the throttling valve or valves 43. Recirculated scavenging steam performs useful work as opposed to being fed to a feedwater heater (which is a lower energy point in the system) so that the net effect of our improvement in reheater operation is improved reliability of reheater operation without any serious detriment to the efficiency of operation of the entire system. In fact our use of exhausted tubeside steam is an improvement over prior practice which involved feeding a lesser quantity of scavenging steam than is effective to substantially eliminate condensate subcooling to a feedwater heater or similar low-pressure point in the turbine cycle.

As illustrated in FIG. 2, we utilize a high $\Delta P$ thermocompressor 70 to circulate scavenging steam to the inlet chamber 33 of header 19 of reheater 16 in order to provide sufficient excess high-pressure steam to the individual tubes 22 of the tube bundle 18 to substantially eliminate condensate subcooling even in those tubes which are subjected to the greatest temperature differential.

Figure 3:
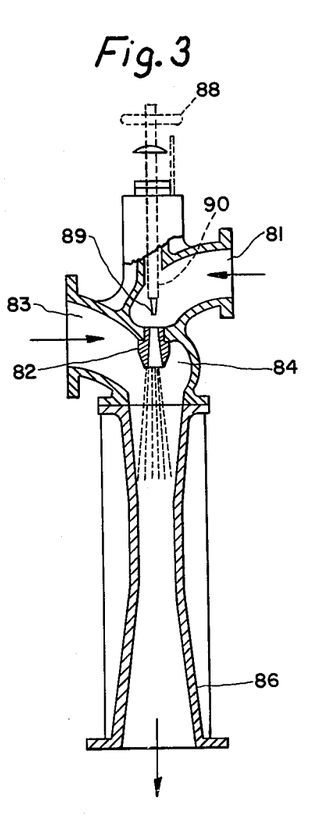
FIG. 3 is a vertical cross-sectional view of a thermocompressor illustrative of that which may be used in the apparatus of FIG. 2.

The motive fluid for thermocompressor 70 is provided through line 71 and is the main steam available from heating steam pipe 50 taken upstream of throttling valve or valves 43. This steam at a pressure of approximately 1000 psia powers thermocompressor 70 to provide scavenging steam for reheater 16. In general, the amount of steam used for this purpose is only approximately 5% to 10% of the theoretical amount of steam supplied to the inlet chamber of reheater 16, as is determined by the tube bundle 18 heat load. Thermocompressor 70, illustrated in detail in FIG. 3, is operated by high-pressure motive steam to cause a greater quantity of suction steam than of motive steam to be drawn through line 72 from exhaust chamber 34 of header 19 of reheater 16. The combined flow leaves thermocompressor 70 at intermediate pressure creating a desired high scavenging flow which is input to reheater 16.

In thermocompressor 70, with suction or low-pressure steam available from line 72 from exhaust chamber 34 of reheater 16 and motive steam from line 71, the net result is a flow of steam through line 73 into line 50, which supplies throttled main steam to inlet chamber 33 of header 19 of reheater 16, or which may be fed directly into inlet chamber 33.

The method and apparatus provided in accordance with our present invention of providing increased scavenging steam to substantially eliminate condensate subcooling and related instabilities is very economical and thermodynamically very efficient. Not only is the foregoing achieved, but the total efficiency of the system is improved at part load conditions because the amount of scavenging steam that is fed from reheater 16 to a lower point in the system, e.g., to feedwater heaters, for example, is greatly reduced, thus minimizing a less efficient use of hot steam.

It is not necessary to take special precautions, as by special valves to ensure that only a small portion of the inlet steam, e.g., 2 to 10% of theoretical in the main steam line is used as motive steam for thermocompressor 70. This is because under these conditions the thermocompressor is self-limiting, operating in a "choked mode" and takes only that amount of steam necessary to recirculate available scavenging steam.

An additional advantage of our invention is that the system is readily adaptable for the use of commercially available thermocompressors whose operating parameters are well understood.

In accomplishing our objective of substantially eliminating condensate subcooling and related instabilities, a greater quantity of scavenging steam is generally requied than one would expect to recirculate with a low $\Delta P$ thermocompressor. On the other hand, a high $\Delta P$ thermocompressor in our invention can achieve these rates of recirculation flow. The high $\Delta P$ thermocompressor is also smaller and it is easy to increase the suction flow rate by adjusting upward the motive steam flow.

As another benefit, a high $\Delta P$ thermocompressor as used in our invention does not cause a reduction in inlet header pressure. A low $\Delta P$ thermocompressor does result in a lower header pressure because it represents a flow resistance in the inlet steam line. A lower header pressure causes a reduction in thermal efficiency because the steam temperature is reduced.

A thermocompressor which may be utilized in practicing our invention may readily be obtained from AMETEK Corporation, Schutte and Koerting Division, Cornwells Heights, PA. A typical thermocompressor is illustrated in FIG. 3.

In FIG. 3, thermocompressor 70 comprises a motive steam inlet 81, a nozzle 82, a suction steam inlet 83, a body or mixing area 84, and a diffuser and discharge section 86.

In practicing our invention in its simplest form, a fixed nozzle thermocompressor using the nozzle 82 in FIG. 3 is suitable. However, in a preferred embodiment of our invention we use an adjustable nozzle thermocompressor, which is illustrated in FIG. 3. The adjustment of nozzle 82 is achieved by turning knob 88 to cause needle valve 89 at the end of shaft 90 to partially obstruct the area of the inlet side of nozzle 82. With this added degree of freedom the degree of scavenging may be adjusted as desired to suit a particular mode of operation, or a different setting may be desirable for each different installation.

While the invention has been set forth herein by means of specific descriptions and structure for purposes of a concise explanation, many modifications thereof may readily occur to those skilled in the art. For example, although the invention has been described herein with respect to a throttled single-stage reheater and scavenging steam has been recirculated by unthrottled main steam, it is equally applicable to any MSR tube bundle which is fed by high-pressure steam which is substantially throttled at some load range. Thus in a two-stage MSR, applying the same principles, recirculation of scavenging flow would be accomplished in the higher pressure bundle. Additionally, the other tube bundle configurations, such as straight-through tube bundles, known in the art, may be used in lieu of U-tube bundles as described herein. Similarly, although we have described a high $\Delta P$ thermocompressor as the pumping means for recirculating scavenging steam in the reheater tube bundle, other equivalent pumping means which meet the same functional requirements as a high $\Delta P$ thermocompressor, such as a turbine compressor, may be used. Accordingly, we intend, by the appended claims, to cover all such modifications and changes as fall within the true spirit and scope of this disclosure.

What is claimed is:

1. The method of substantially eliminating condensate subcooling within the tubes of a reheater of a tube and shell reheater wherein shellside steam is reheated by passing in heat-exchange relationship with tubes of a reheater containing saturated tubeside steam, said reheater having an input of saturated steam which is at higher pressure than that of the saturated steam which is input to the shellside, which method comprises:
    (a) throttling main line steam to provide a reduced pressure of steam input to said reheater;
    (b) supplying exhausted scavenging steam from said reheater to a low-pressure input of a high differential pressure pumping means;
    (c) supplying unthrottled main line steam to said high differential pressure pumping means;
    (d) isentropically expanding said main steam in said pumping means and entraining the exhausted scavenging steam of said reheater therein; and
    (e) supplying the exhaust of said pumping means to the input header of said reheater to substantially eliminate condensate subcooling in the tubes of said tube bundle at throttled, partial loading conditions.

2. The method of claim 1 wherein the ratio of pressure of unthrottled main steam to the pressure of exhausted scavenging steam from said reheater is at least 1.5:1.

3. In a moisture separator reheater having a vapor-tight shell, means for passing cool wet shellside steam therethrough, means within said shell for removing entrained moisture from said shellside steam, a reheater therein for raising the temperature of said dried shell-side steam, said reheater comprised of an inlet header, an outlet header, and a plurality of substantially parallel heat exchange tubes comprising a tube bundle connected therebetween and extending along said shell longitudinally and in heat-transfer relationship with said shellside steam and wherein said reheater is supplied with saturated tubeside steam at a temperature and pressure greater than the temperature and pressure at which saturated shellside steam is supplied, the improvement comprising: means for throttling available main steam to provide a source of throttled saturated steam for said reheater for heating shellside steam; means for providing an additional flow of steam to the inlet header of said reheater sufficient to substantially eliminate condensate subcooling within said tubes at throttled partial loading conditions, said means comprising a high differential pressure thermocompressor; means for supplying exhausted steam from said outlet header of said reheater to a low-pressure input of said thermocompressor; means for supplying unthrottled main steam taken from the reheater steam inlet upstream of the throttling means to a high-pressure input of said thermocompressor, and means for supplying the output of said thermocompressor to the inlet header of said reheater.

4. The apparatus of claim 3 wherein said thermocompressor operates with a pressure ratio of high-pressure steam to low-pressure steam which is at least 1.5:1.

5. The apparatus of claim 3 wherein steam flow into the inlet ends of respective tubes is partially restricted to provide a greater flow of saturated steam into the tubes thereof which are subject to greater heat-transfer loading than other tubes of said bundle.

6. The apparatus of claim 3 wherein said individual heattransfer tubes in said tube bundle are U-tubes and are oriented in a substantially vertical plane and said inlet and outlet headers comprise separate chambers of a unitary header structure.

7. A moisture separator reheater adapted to receive relatively wet, low-temperature inlet steam at an inlet thereof and for drying and reheating said inlet steam to produce dry hot outlet steam and comprising:
(a) a pressure-tight shell;
(b) at least one steam inlet means located along one surface of said shell;
(c) at least one steam outlet means located along another surface of said shell;
(d) means adjacent said inlet for removing entrained moisture from inlet steam;
(e) a tube bundle heat exchanger located longitudinally within said shell and disposed between said inlet and outlet and in heat-exchange relationship with steam passing between said inlet and outlet;
(f) a header extending along a first end of said tube bundle and receiving in pressure-sealed relationship the ends of said tubes comprising said tube bundle and having therein at least one baffle separating said header into a plurality of chambers including at least an inlet header and an outlet header adapted to receive respective ends of said tubes;
(g) means for directing relatively cool moist steam into said shell through said steam inlet in said shell to allow the same to pass in heat-exchange relationship with said tube bundle and emerge from said steam outlet on said other surface of said shell as hot dry steam;
(h) means for supplying a flow of saturated high-pressure tubeside steam at a temperature substantially above that of shellside steam entering said shell inlet to the inlet chamber of said header;
(i) throttle means within said flow supply means for reducing main line steam pressure to a lower value supplied to said inlet header of said reheater;
(j) pumping means operative to recirculate steam from said outlet header to said inlet header, adapted to receive motive steam from the heating steam inlet pipe taken upstream of said throttling means to isentropically expand the same and to entrain steam from said exhaust header therein to provide a second input to said inlet header, both of said inputs being saturated or slightly superheated steam;
(k) said second steam input from said pumping means to said inlet header being of sufficient mass flow rate to substantially eliminate condensate subcooling within the tubes of said tube bundle at throttled, partial loading conditions.

8. The apparatus of claim 7 wherein said pumping means is a thermocompressor requiring a high differential in pressure between motive fluid and suction fluid for its operation having no moving parts and which operates to combine a high-pressure flow of motive steam with a relatively low-pressure flow of suction steam to produce an increased volume of intermediate pressure steam.

9. The apparatus of claim 8 wherein said thermocompressor operates with a pressure ratio of high-pressure fluid to low-pressure fluid of at least 1.5:1.

10. The apparatus of claim 7 wherein tubeside steam flow into certain of the tubes is restricted to allow greater saturated steam flow to enter the inlet ends of U-tubes which are subjected to greater heat transfer loading than other tubes of said tube bundle.

11. The apparatus of claim 7 wherein said individual U-tubes in said tube bundle are oriented in a substantially vertical plane and said baffle in said header divides said header into upper and lower chambers.

* * * * *